(12) United States Patent
Valcan (10) Patent No.: US 11,368,025 B2
(45) Date of Patent: Jun. 21, 2022

(54) HYBRID POWER PLANT AND A METHOD FOR CONTROLLING A HYBRID POWER PLANT

(71) Applicant: VESTAS WIND SYSTEMS A/S, Aarhus N (DK)

(72) Inventor: Dumitru-Mihai Valcan, Langå (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 0 days.

(21) Appl. No.: 17/259,431

(22) PCT Filed: Jun. 24, 2019

(86) PCT No.: PCT/DK2019/050202
§ 371 (c)(1),
(2) Date: Jan. 11, 2021

(87) PCT Pub. No.: WO2020/011320
PCT Pub. Date: Jan. 16, 2020

(65) Prior Publication Data
US 2021/0281079 A1    Sep. 9, 2021

(30) Foreign Application Priority Data
Jul. 9, 2018    (DK) .......................... PA 2018 70476

(51) Int. Cl.
*H02J 3/38* (2006.01)
*F03D 7/04* (2006.01)
(Continued)

(52) U.S. Cl.
CPC .............. *H02J 3/381* (2013.01); *F03D 7/042* (2013.01); *F03D 9/11* (2016.05); *H02J 3/32* (2013.01);
(Continued)

(58) Field of Classification Search
CPC ...... H02J 3/38; H02J 3/381; H02J 3/32; H02J 3/48; H02J 2300/28; H02J 2300/24; F03D 7/04; F03D 7/042; F03D 9/11
See application file for complete search history.

(56) References Cited

U.S. PATENT DOCUMENTS

| 2012/0323396 | A1 | 12/2012 | Shelton et al. |
| 2015/0012144 | A1 | 1/2015 | Wang et al. |
| 2017/0114527 | A1 | 4/2017 | Taylor et al. |

FOREIGN PATENT DOCUMENTS

| CN | 105337315 A | 2/2016 |
| CN | 107887903 A | 4/2018 |

(Continued)

OTHER PUBLICATIONS

Danish Patent and Trademark Office First Technical Examination for Application No. PA 2018 70476 dated Jan. 28, 2019.
(Continued)

*Primary Examiner* — Robert L Deberadinis
(74) *Attorney, Agent, or Firm* — Patterson + Sheridan, LLP (57) ABSTRACT

The invention relates to a hybrid power plant with a plurality of energy assets comprising several renewable power generating units, preferably in turn comprising wind turbines and/or solar power units, and an energy storage unit, such as battery energy system. A power plant controller receives information indicative of a power limitation from the energy storage unit, and dynamically modify the active power set points by corresponding weighting factors according to the capabilities of the respective energy assets in response to this power limitation so as to produce active power from the hybrid power plant. The invention may compensate for this power limitation by modifying correspondingly the active power set points of the hybrid power plant according to the capability of the energy assets so as to maintain a desired
(Continued)

power production, and maintain a sufficiently smooth ramp rate when changing a parameter related to the power production.

15 Claims, 6 Drawing Sheets

(51) Int. Cl.
    *F03D 9/11*       (2016.01)
    *H02J 3/32*       (2006.01)
    *H02J 3/48*       (2006.01)

(52) U.S. Cl.
    CPC ............. *H02J 3/48* (2013.01); *H02J 2300/24* (2020.01); *H02J 2300/28* (2020.01)

(56) References Cited

FOREIGN PATENT DOCUMENTS

| | | |
|---|---|---|
| EP | 2072813 A3 | 12/2012 |
| WO | 2013000474 A2 | 1/2013 |
| WO | 2017062905 A1 | 4/2017 |
| WO | 2017114527 A1 | 7/2017 |
| WO | 2020011320 A1 | 1/2020 |

OTHER PUBLICATIONS

PCT Notification of Transmittal of the International Search Report and the Written Opinion of the International Searching Authority, or the Declaration for Application Numner PCT/DK2019/050202 dated Sep. 13, 2019.

HYBRID POWER PLANT AND A METHOD FOR CONTROLLING A HYBRID POWER PLANT

FIELD OF THE INVENTION

The present invention relates to a hybrid power plant with a plurality of energy assets comprising several renewable power generating units, preferably in turn comprising wind turbines and/or solar power units, and an energy storage unit. The invention also relates to a corresponding method, a corresponding controller, and a corresponding computer program product to implement the present invention.

BACKGROUND OF THE INVENTION

Recently, various kinds of renewable energy are gaining increased success in countries around the world to produce electricity for the local electrical grid due to the gradual transition to a non-fossil based energy system taking place, but electrical grids also have requirements for such an integration of renewable energy to be effective.

For example, the high penetration of wind turbines in the electrical grids has motivated requirements for the wind turbines on how they should contribute to the stability of the electrical grids. Such requirements are included in so-called grid codes defined by the transmission system operator (TSO), which the wind power plants, sometimes called wind farms, must comply with for producing power to the electrical grid.

Recently, there is an emerging trend to integrate various renewable energy sources into a so-called hybrid power plant with a plurality of energy assets i.e. with several power generating units, such as wind turbines and solar power units, together with an energy storage system, such as a large battery. Expectations are set at a high reliability of power produced from a hybrid power plant because of the possible complementary nature of the local wind and solar sources of energy, e.g. the sun may not be shining in the evening, when the winds are relatively strong.

Some of the requirements, which may be included in the grid codes, include maintaining a certain delivered power, voltage and frequency, and possibly having certain limits for the rate of changes of such parameters, e.g. so-called ramp rates. These requirements are expectantly also imposed on future hybrid power plants, and it is therefore important to be able to deliver energy according to the grid codes for such hybrid power plants, too.

Hence, an improved hybrid power plant would be advantageous, and in particular a more efficient and/or reliable hybrid power plant would be advantageous.

Object of the Invention

It is a further object of the present invention to provide an alternative to the prior art.

In particular, it may be seen as an object of the present invention to provide a hybrid power plant that solves the above mentioned problems of the prior art with producing power in compliance with grid codes, especially upon changing of certain parameters.

SUMMARY OF THE INVENTION

Thus, the above described object and several other objects are intended to be obtained in a first aspect of the invention by providing a hybrid power plant connected to an associated electrical grid for producing power to said electrical grid, the hybrid power plant comprising a plurality of energy assets, the plurality of energy assets comprising:

a first renewable power generating unit, preferably said first renewable power generating unit comprises a plurality of wind turbine generators (WTG1, WTG2), a second renewable power generating unit, preferably said second renewable power generating unit comprises a plurality of solar power units (PV1, PV2), and an energy storage unit, preferably a battery energy storage system (BES), said energy storage unit being capable of storing energy from said first and second renewable power generating units, and delivering power to said electrical grid when required, wherein the hybrid power plant further comprises a power plant controller arranged to communicate with the plurality of energy assets, the power plant controller being arranged for receiving an active power reference and correspondingly distribute active power set points to the plurality of energy assets, and wherein the power plant controller is further arranged to receive information indicative of a power limitation from the energy storage unit, and dynamically modify the active power set points by corresponding weighting factors according to the capabilities of the respective energy assets in response to said power limitation so as to produce active power from the hybrid power plant accordingly.

The invention is particularly advantageous for obtaining a hybrid power plant where the first and second renewable power generating unit, upon the event of a power limitation in, or from, the energy storage unit, such a discharge limit from a battery energy storage system, may effectively compensate for this power limitation by modifying correspondingly the active power set points of the hybrid power plant according to the capability of the energy assets so as to maintain a desired power production (within a certain range) for the hybrid power plant, or maintain a sufficiently smooth ramp rate when changing a parameter related to the power production. Indeed, the present inventor has performed simulations that supports these benefits of the present invention when changes in power production takes place in a hybrid power plant.

In the context of the present invention, the term 'hybrid power plant' will be broadly understood as a power plant capable of producing power for the electric grid based on several sources of energy, including, but not limited to, wind energy, solar energy, hydro energy, thermal energy, etc., in the sense that the hybrid power plant has a mixture of energy sources producing power. It is to be understood that the hybrid power plant will be controlled collectively at some overall level of control to produce power, but the various energy assets may, additionally or alternatively, have some degree of local control. It is also to be understood that the hybrid power plant may have a large geographical extent, e.g. the plurality of energy assets may be scattered at several locations, for example up to 2, 5, 10, 15 or 20 km, or even longer, apart, as long as the power plant controller is capable of provide some degree of overall level of control according to the present invention, especially considering electrical losses and/or control and measurement delays.

In the context of the present invention, the first renewable power generating unit may comprise a plurality of wind turbines, each wind turbine, or wind turbine generator (WTG), may comprise a tower and a rotor with at least one rotor blade, such as three blades. The rotor may be connected to a nacelle, which is mounted on top of the tower and being adapted to drive a generator situated inside the nacelle.

The rotor is rotatable by action of the wind. The wind induced rotational energy of the rotor blades is transferred via a shaft to the generator. Thus, the wind turbine is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into the electrical power grid. The plurality of wind turbines may different, or they may be of the same kind.

In the context of the present invention, the second renewable power generating unit may comprise a plurality of solar power units, which each solar power unit may have e.g. a photovoltaic (PV) solar panel, a concentrated solar power (CSP) unit, or other solar power units capable of utilising the solar radiation and converting it to electrical power.

In the context of the present invention, the energy storage unit is be understood broadly as a unit capable of storing energy from the first and/or second renewable power generating units generating power during period of surplus energy, and then store the energy for some period of time until the need arise for the energy to be supplied into the electrical grid. In general, the energy storage unit may be used to store energy from the grid as well, in periods when energy is cheap and release it to the grid when energy is expensive. This is known as "Energy Arbitrage". Thus, it will be understood that for a hybrid power plant to rely on the energy storage unit, the stored energy may be of a certain minimum size to be of any significant use at a later time. Thus, it is consider that a minimum amount of energy of 0.5 MWh, 1 MWh, 2 MWh, 3 MWh, 4 MWh, or 5 MWh, is to be stored by the energy storage unit. Similarly, the power supplied to the electrical grid may be capable of a certain minimum power, for example at least 0.5 MW, 1 MW, 2 MW, 3 MW, 4 MW, or 5 MW, to have an impact on the hybrid power plant complying with the relevant grid codes for power production. Alternatively, the ratio of the energy storage unit power to the total power of the hybrid power plant may be minimum 1%, 2%, 3%, 4% or 5% to have an impact on the electrical grid. Alternatively, the ratio of the energy storage unit power to the total power of the hybrid power plant may be maximum of 20%, 15%, 10%, 8%, 6%, 4% or 2% because the energy storage unit is typically the most expensive energy asset, either at a given moment or averaged over some period of time.

Suitable energy storage units may preferably be based on electrochemical storage, such as a battery energy storage system (BES), more preferably including rechargeable Lithium ion batteries (LIB), but other energy storage units are also contemplated within the present invention, for example based on mechanical storage (e.g. compressed air reservoirs), electrical storage (e.g. so-called supercapacitors), thermal energy storage, or chemical energy storage (e.g. power-to-gas P2G), or other energy storage means suitable for power plant energy storage and subsequent power delivery to the electrical grid.

In the context of the present invention, the power limitation of the energy storage unit is be understood broadly in the sense that it may relate to any parameter, direct or indirectly, resulting in limited power production that can be discharged and/or charged from the energy storage unit, currently and/or after a short time. In general it is expected that the power limitation may be reflecting the instant charging/discharging capability. That implies a maximum delay corresponding to the control loop sample time and communication delay (e.g. in the range of say 30 ms to 200 ms). In particular, the power limitation may descriptive of the capability or resources available for power discharging and/or charging. Alternatively or additionally, the information indicative of the power limitation may be related to the capability of storing energy, e.g. how close the energy storage unit is to the full capability of energy storage. Preferably, the power limitation may be related to a charge and/or discharge limitation of a battery energy storage system (BES or BESS), more preferably based on electrochemical storage. For example, the power plant controller (PPC) could receive the state of charge of the battery and decide the charging and discharging power itself within certain assumptions and conditions.

In the context of the present invention, the first and second renewable power generating units and the energy storage unit may be defined collectively as energy assets. It not excluded that yet other energy assets could cooperate with the said energy assets of the present invention, especially energy assets based on fossil fuels (carbon based), such power generating unit being based on oil, coal, hydrocarbon gas etc. In this technical field, the energy assets may also be referred to as 'energy actuators', as the skilled person will readily understand. The two terms will be interchangeably used below in the detailed description.

In an advantageous embodiment, the hybrid power plant may further comprise:
- a module for deriving an estimated value for electrical losses in the hybrid power plant;
- a module for deriving a measured value for electrical losses in the hybrid power plant, based on a difference between an aggregated power production from the plurality of energy assets and a power measurement at a point of common coupling (PoC), and
- a regulator arranged to apply the estimated value for electrical losses and the measured value for electrical losses in an active power control loop in the power plant control, the active power control loop being arranged to control an active power production of the hybrid power plant at the point of common coupling.

Thus, if estimates of power may differ from actual measurements for example due to electrical losses, this embodiment may compensate and/or reduce this. In another advantageous embodiment, the information indicative of a power limitation may comprise a charge and/or discharge limitation from the energy storage unit being a third energy asset, e.g. for battery energy storage system (BES), though other limitations may also form part of this power limitation according to the present invention. Additionally, the first and second renewable power generating units may form a first and a second energy asset, respectively, and, if a power limitation from the third asset results in a difference between the power reference and an aggregated power production from the plurality of energy assets, the power plant controller (PPC) then being arranged to modify the active power set points of said first and a second energy assets by corresponding weighting changing factors being a function of said difference between the power reference and an aggregated power production measured from said first and second energy assets. Furthermore, the hybrid power plant may then have each corresponding weighting changing factor of an energy asset being further a function of the power from each energy asset, preferably based on available power and/or nominal power from each energy asset.

In yet another advantageous embodiment, the active power set point distributed by the power plant controller (PPC) to the energy storage unit may be determined by the capability of the third energy asset resulting from said power limitation in the third energy asset, preferably based on the available power and/or nominal power from said third energy asset as will be explained in further details below. It is also contemplated that other measures of capability of the third energy asset may be applied.

In some embodiments, the hybrid power plant may be operated in a mode, wherein the power plant controller (PCC) distributes the active power set point to the energy storage unit, said active power set point being determined externally to the hybrid power plant, e.g. for energy arbitrage. It may also be considered externally relative to the control loop, e.g. from another control loop in the hybrid power plant.

In other embodiments, the hybrid power plant may be operated in a curtailment reduction mode, wherein the power plant controller (PCC) is operated so as to reduce, or limit,
  curtailment of the first renewable power generating unit, preferably one, or more, wind turbine generators of said plurality of wind turbine generators (WTG1, WTG2), and/or
  curtailment of the second renewable power generating unit, preferably one, or more, solar power units of said plurality of solar power units (PV1, PV2),
  by charging accordingly the energy storage unit (ESU), and therefore store the otherwise lost energy.

Beneficially, the hybrid power plant may be in a constant power control mode, wherein the power plant controller (PCC) is operated so as to maintain a substantially constant power level from the hybrid power plant according to the active power reference particularly comprising discharging accordingly the energy storage unit because this is often required by the grid codes.

Beneficially, the hybrid power plant may be in a frequency control mode, wherein the power plant controller (PCC) is operated so as to balance a frequency change by a corresponding power produced from the hybrid power plant particularly comprising discharging, or charging, the energy storage unit (ESU) because this is often required by the grid codes, too.

In some embodiments, the hybrid power plant may be operated in a plurality of modes for the power plant controller, and wherein at least one mode among the plurality of modes is prioritised over the remaining modes. In one example, the said curtailment reduction mode, said constant power control mode or said frequency control mode, may have priority over a mode wherein the active power set point is determined externally to the hybrid power plant.

In a second aspect, the invention relates to a method for controlling a hybrid power plant, the hybrid power plant being connected to an associated electrical grid for producing power to said electrical grid, the hybrid power plant comprising a plurality of energy assets, the plurality of energy assets comprising:
  a first renewable power generating unit, preferably said first renewable power generating unit comprises a plurality of wind turbine generators (WTG1, WTG2),
  a second renewable power generating unit, preferably said second renewable power generating unit comprises a plurality of solar power units (PV1, PV2), and
  an energy storage unit, preferably a battery energy storage system (BES), said energy storage unit being capable of storing energy from said first and second renewable power generating units, and delivering power to said electrical grid when required,
  wherein the method comprises controlling a power plant controller (PPC) arranged to communicate with the plurality of energy assets, the power plant controller being arranged for receiving an active power reference and correspondingly distribute active power set points to the plurality of energy assets, and
  wherein the method further comprises receiving information indicative of a power limitation from the energy storage unit, and dynamically modify the active power set points by corresponding weighting factors according to the capabilities of the respective energy assets in response to said power limitation so as to produce active power from the hybrid power plant accordingly.

In a third aspect, the invention relates a power controller for controlling an associated hybrid power plant connected to an associated electrical grid for producing power to said electrical grid, the hybrid power plant comprising a plurality of energy assets, the plurality of energy assets comprising:
  a first renewable power generating unit, preferably said first renewable power generating unit comprises a plurality of wind turbine generators (WTG1, WTG2),
  a second renewable power generating unit, preferably said second renewable power generating unit comprises a plurality of solar power units (PV1, PV2), and
  an energy storage unit, preferably a battery energy storage system (BES), said energy storage unit being capable of storing energy from said first and second renewable power generating units, and delivering power to said electrical grid when required,
  wherein the power plant controller (PPC) is arranged to communicate with the plurality of energy assets, the power plant controller being arranged for receiving an active power reference and correspondingly distribute active power set points to the plurality of energy assets, and wherein the power plant controller is further arranged to receive information indicative of a power limitation from the energy storage unit, and dynamically modify the active power set points by corresponding weighting factors according to the capabilities of the respective energy assets in response to said power limitation so as to produce active power from the hybrid power plant accordingly.

In a fourth aspect, the invention relates to a computer program product being adapted to enable a computer system comprising at least one computer having data storage means in connection therewith to control a hybrid power plant according to the first and/or second aspect of the invention.

This aspect of the invention is particularly, but not exclusively, advantageous in that the present invention may be accomplished by a computer program product enabling a computer system to carry out the operations of the second aspect of the invention when down- or uploaded into the computer system.

In yet another aspect, the invention relates to a data storage medium whereupon such a computer program product may be provided, i.e. on any kind of computer readable medium, or through a network.

The individual aspects of the present invention may each be combined with any of the other aspects. These and other aspects of the invention will be apparent from the following description with reference to the described embodiments.

BRIEF DESCRIPTION OF THE FIGURES

The present invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
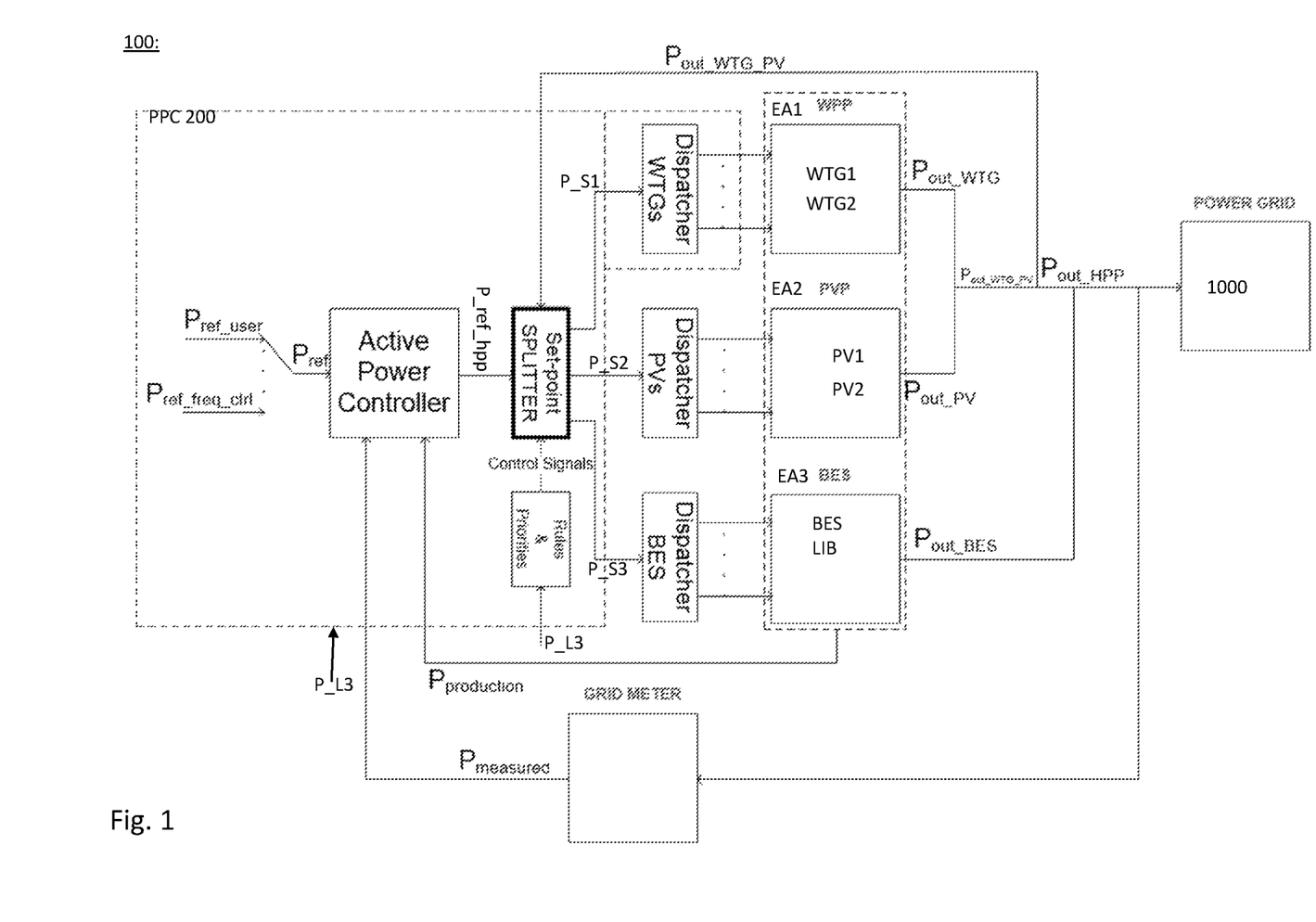
FIG. 1 is a schematic drawing of the hybrid power plant according to an embodiment of the present invention.

FIG. 1 is a schematic drawing of the hybrid power plant 100 according to an embodiment of the present invention. The hybrid power plant 100 is connected to associated electrical grid 1000 for producing power to the electrical grid, the hybrid power plant comprising a plurality of energy assets EA1, EA2 and EA3.

Thus, a first renewable power generating unit EA1 or 1RPGU is part of the plant 100, i.e. in this embodiment a plurality of wind turbine generators, WTG1 and WTG2, and a second renewable power generating unit, EA2, 2RPGU, i.e. in this embodiment a plurality of solar power units, PV1 and PV2. For simplicity, only two wind turbines and solar power unit are indicated in this embodiment, but of course the skilled person would understand that any number of renewable power generating units is in principle contemplated within the teaching and principle of the present invention.

Additionally, an energy storage unit, EA3 or ESU, is part of the plant 100, preferably a battery energy storage system (BES) which is capable of storing energy from said first and second renewable power generating units, i.e. from the wind turbine generators, WTG1 and WTG2, and solar power unit, PV1 and PV2, and the energy storage unit being arranged for delivering power to said electrical grid 1000 when required.

The hybrid power plant further comprises a power plant controller PPC 200 arranged to communicate with the plurality of energy assets, i.e. receive information about their state/condition and generally send control signals to each of them, and the power plant controller is particularly arranged for receiving an active power reference P_REF (as indicated to the left of the PPC), for example provided by a grid operator, and correspondingly distribute active power set points, P_S1, P_S2, and P_S3 to the plurality of energy assets as shown in FIG. 1. It may be mentioned that in some embodiments, the WTG Dispatcher may form part of the controller PPC 200. The P_REF is the reference received either from the grid operator (TSO) or a user, but it can also be from another controller—such as Frequency Controller as indicated by the signal name Pref_freq_ctrl.

In general it is expected that the controller PPC 200 will communicate directly with the WTG1 and WTG2, and it will communicate to the energy storage BES and PV1 and PV2 through dedicated ES and PV controllers (similar to a power plant controller PPC but specifically for PV and BES). These dedicated controllers will then distribute the set-point to individual PV array converters or individual ES converters (i.e. the PV and ES systems are composed of a plurality of units, just as the wind power plant system). In the shown embodiment, the controller PPC 200 communicates via a Set-point SPLITTER, the Set-point SPUTTER then dispatches set point PS_1, PS_2 and PS_3 further to a local dispatcher for each energy assets.

It is also contemplated that it is possible to distribute set points to WTGs through local controllers. That is one master PPC distributes set-points to one/more slave PPC, for example for large wind turbine parks with a large number of wind turbine generators, such as more than 20 wind turbines, or more than 40 wind turbines.

Furthermore, the power plant controller 200 PPC is further arranged to receive information indicative of a power limitation P_L3 from the energy storage unit ESU, for example a charge and/or discharge limitation from the BES, and dynamically modify the active power set points by corresponding weighting factors WF1, WF2, WF3 according to the capabilities of the respective energy assets in response to said power limitation so as to produce active power from the hybrid power plant accordingly. As schematically indicated the plant produces power given by P_out_HPP.

Consider a hybrid power plant 100 with an installed power of 1 pu like the plant shown in FIG. 1. The plant comprises WT, PV and BESS energy assets in the following proportions of installed power:

$WT=0.5pu, PV=0.4pu$, and $BESS=0.1pu$.

That gives the following weighting of the actuators:

$W\_wt=(P\_wt)/(P\_wt+P\_pv+P\_bess)=0.5pu$, and similarly $W\_pv=0.4pu$, $W\_bess=0.1pu$.

Assuming that the plant total active power reference P_ref_hpp is now at 0.3 pu, based on their weighting; the WT, PV and BESS energy assets will experience the following set-points P_S1, P_S2, and PS_3:

$WT=0.3pu*W\_wt=0.15pu$, and similarly $PV=0.12pu, BESS=0.03pu$.

This explains the basic principle of set-point distribution based on actuator capabilities or actuator weightings as such fractions are also known in this field.

In a theoretical approach, if one considers that BES normally experiences charging and discharging power limitations (e.g. charging and discharging power is limited by the state of charge, charging and discharging power is limited due to BES size relative to the total plant size, etc.), then assuming that the power limitation is full (in other words charging/discharging power is zero), then one would like to transfer that charging/discharging limitation to the remaining energy assets in the hybrid power plant (in this case WTGs and PVs).

An approach would be to distribute the charging/discharging limitation equally to the two actuator groups i.e. energy assets regardless of their weighting in the plant:

$WT=P\_ref\_hpp*(W\_wt+W\_bess/2)$, and $PV=P\_ref\_hpp*(W\_pv+W\_bess/2)$.

If the battery charging/discharging limitation is not full—in other words, the battery can handle some charging/discharging set-points but not the full set-point requested by the control loop based on the total plant reference P_ref_hpp and the BES weighting, then the amount of power reference that is not achieved by the BES due to charging/discharging limitations has to be moved to the WT and PV actuator group.

This is done by altering/changing the weighting of the WT and PV actuators by a weighting changing factor as described above. So the WT and PV actuator references would be calculated as follows:

$$WT = P\_ref\_hpp * (W\_wt + W\_ch\_factor\_bess * (W\_wt/(W\_wt + W\_pv)));$$

$$PV = P\_ref\_hpp * (W\_pv + W\_ch\_factor\_bess * (W\_pv/(W\_wt + W\_pv)));$$

In the above:

W_wt, W_pv—weightings of the WT and PV actuator groups based on their installed power share in the hybrid plant.

W_ch_factor_bess—weighting changing factor (showing the weighting of BES that has to be distributed to the other actuator groups) calculated as follows:

$$W\_ch\_factor\_bess = (Pref\_hpp * W\_bess - Pcharging)/Pref\_hpp;$$

The terms (W_wt/(W_wt+W_pv)) and (W_pv/(W_wt+W_pv)) shows how much of the weighting changing factor WCF above gets distributed to the WT and PV actuators, respectively.

In another embodiment of the present invention, the above algorithm would be modified so that this term that distributes the weighting changing factor WCF is also based on the WT and/or PV actuator available power. This was however not yet explored by simulation, but it is expected that this may be implemented having corresponding capabilities or weighting W_wt and W_pv to be based on the available power instead of the installed power as above described. One may then add new weighting parameters W_wt_pava and W_pv_pava as separate factors that somehow would get included in the above formula to reflect the weighting based on available power. The reason being that if the set-points are changing dynamically based on limitations of some energy assets, the other assets could be requested a reference that is higher than their installed power.

Thus, the general principle of the present invention is to assign weightings to each group of energy assets in the hybrid power plant 100 as follows;

Distribute the active power set-point produced by the active power controller 200 of an active power control loop, based on the weighting of each energy asset.

If the energy asset for energy storage experiences one or more power limitations P_L3, for example a limitation of the charging and discharging power of the energy storage unit, the weighting of the other remaining assets is altered such that their power reflects the battery power limitation (changing actuator weighting). In other words, the set-point distributed to the remaining assets is correspondingly increased, or reduced, with an amount that reflects this power limitation of the energy storage unit.

Then the controller sends nominal set-points to the WT and PV actuators, and send the difference between the total regulated plant reference P_ref_hpp and the sum of WT and PV actuator production to the BES. This happens upon defined conditions that address the relation between battery charging/discharging limits and the difference between the total plant reference and the sum of WT and PV actuator production.

The controller will, upon different conditions than above, thereafter then send modified references to the WT and PV actuators. The weighting of the WT and PV actuators is a modified weighting that reflects on one hand the weighting of the respective actuator based on their respective installed power and, on the other hand reflects a weighting changing factor, WCF, that is based on charging/discharging limits of the battery, the plant total reference and the weighting of the WT, PV and BES.

The BES reference is set by the minimum between charging/discharging limits (depending on the sign of the difference between the total plant reference and the sum of WT and PV actuator groups production) and the weighted total plant reference based on BESS installed power. This is in the case the BES set-point is given by the active power loop.

The BES set-point can also be set externally (i.e. by an external set-point) in which case the BES reference is set by the minimum between charging/discharging limits (depending on the sign of the difference between the total plant reference and the sum of WT and PV actuator groups production) and the external BES set-point.

This particular capability of the method allows charging and discharging according to defined priorities and rules. In FIG. 1, it is therefore schematically indicated how the Set-Point SPUTTER can receive rules and/or priorities to implement more advanced control algorithms within the context of the present invention. This will be further explained below, in particular when measuring both power produced and actual power delivered to the grid.

Thus, in particular advantageous embodiments of the present invention, the controller 200 may be using the sum of Active Power Production from the WTGs and PVs, shown in FIG. 1 as P_out_WTG_PV, and not just the sum of their Available Power. That is because the available power signals are in fact estimates and not measurements and therefore might be inaccurate, resulting in low accuracy of the active power controller response.

Figure 2A:
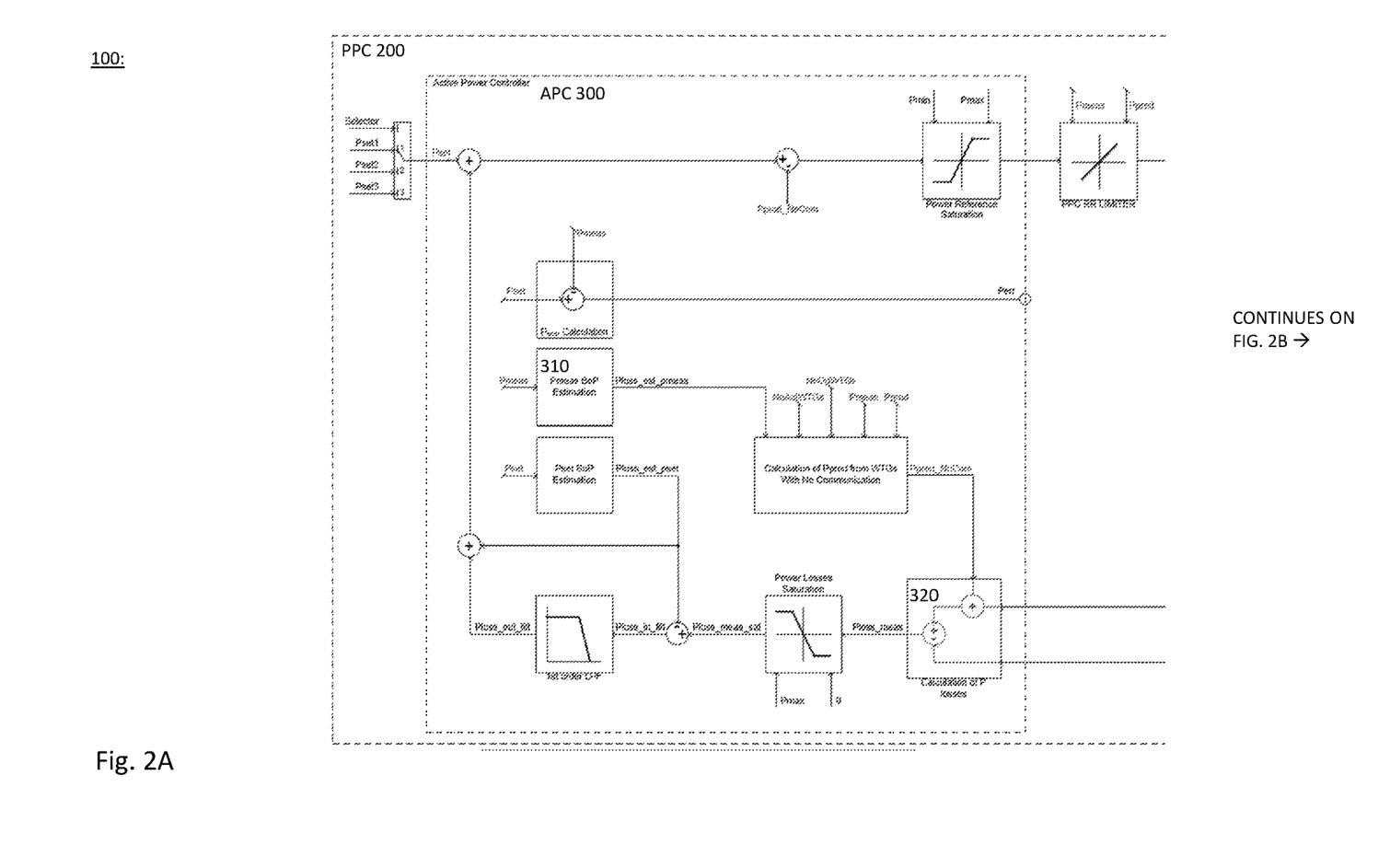
FIG. 2 is a schematic drawing of the hybrid power plant according to another embodiment of the present invention.
Figure 2B:
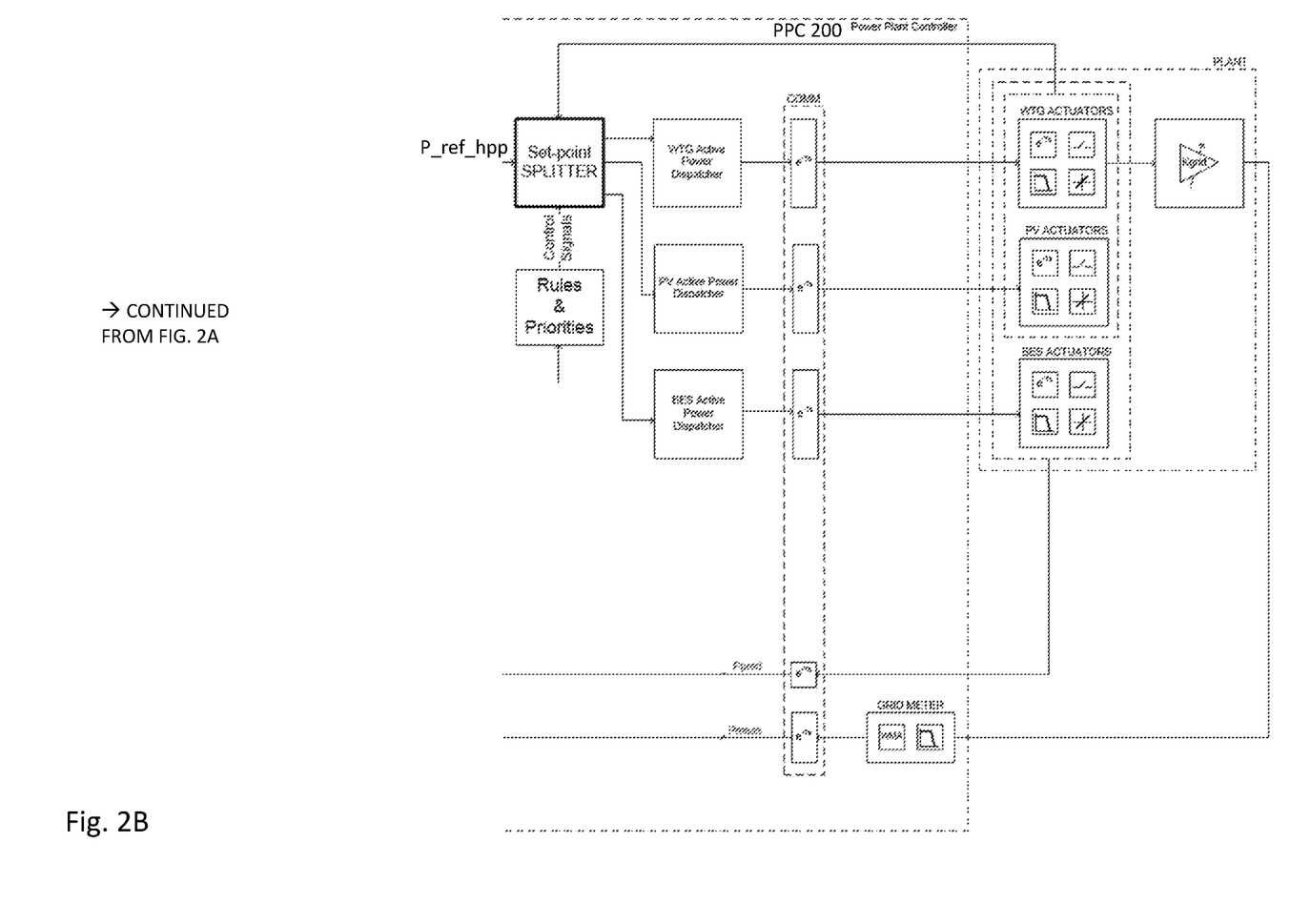

FIG. 2 (both 2A and 2B) is a schematic drawing of the hybrid power plant according to another embodiment of the present invention. Thus, in addition to the hybrid power plant shown in FIG. 1, the hybrid power plant 100 further comprises a module 310 for deriving an estimated value for electrical losses in the hybrid power plant. Moreover, a module 320 is present for deriving a measured value for electrical losses in the hybrid power plant, based on a difference between an aggregated power production Pprod from the plurality of energy assets, here EA1 being WTG actuators, EA2 being PV actuators, and EA3 being BES actuators, and a power measurement Pmeas at a point of common coupling (PoC) with the grid 1000. In addition, the power plant controller comprises a regulator 300 arranged to apply this estimated value for electrical losses and the measured value for electrical losses in an active power control loop in the power plant controller 200, the active power control loop being arranged to control an active power production of the hybrid power plant 100 at the point of common coupling.

In other embodiments, this particular capability of the invention allows charging and discharging according to defined priorities and rules as schematically indicated in both FIGS. 1 and 2 to be available for control.

Such battery charging and discharging rules can be dictated by various operation modes defined for the hybrid power plant 100. For example:

Curtailment reduction mode, under which the hybrid power plant try to reduce the curtailment—by charging the battery (in case of both user set-point or frequency control set-point curtailment)

Constant output control mode, in which the hybrid power plant shall try to maintain a constant power level according to a power reference P_REF—by discharging the battery (in case of user set-point only)

Frequency control mode, in which the plant shall try to regulate its output power according to a frequency droop characteristic—by discharging the battery (in case of under frequency, over frequency (charging) is captured in curtailment reduction)

Manual control of battery, in which the battery is controlled by an external set-point and not by the loop set-point—charging/discharging Arbitrage, in which the battery is controlled by an external set-point, e.g. external to the hybrid power plant, and not by the loop set-point—charging/discharging (similar in nature with manual control).

Given the fact that several operation modes can be active in the same time, a priority can be established among two, or more, of the above modes.

For example:

Charging and discharging due to Frequency Control has priority over charging and discharging due to Arbitrage or Manual Control. This is to avoid handling a disturbance rejection while trying to do frequency control (i.e. need to comply with the droop characteristic).

Charging due to Curtailment Reduction (user set-point) has priority over discharging due to Arbitrage or Manual Control. This is to avoid lost production and overproduction.

Charging due to Curtailment Reduction (user set-point) has same priority as charging due to Arbitrage or Manual Control and depends on which one is the maximum.

Charging due to Arbitrage or Manual Control has priority over discharging due to Constant Output Control (user set-point).

Option 1 (always follow P_REF): Discharging due to Constant Output Control (user set-point) has priority over discharging due to Arbitrage or Manual Control. With this option manual discharge is ignored.

Option 2 (follow P_REF—with manual discharge limit):

Priority of discharging due to Constant Output Control (user set-point) and priority of discharging due to Arbitrage or Manual Control depends on which one is the minimum. Minimum of the two is selected. With this option it is possible to manually control the allowed discharge level.

Charging and discharging due to Manual Control has priority over charging and discharging due to Arbitrage.

Such defined priorities are the ones defining when the battery set-point is dictated by the Active Power Loop and when it is dictated by external references.

Figure 3:
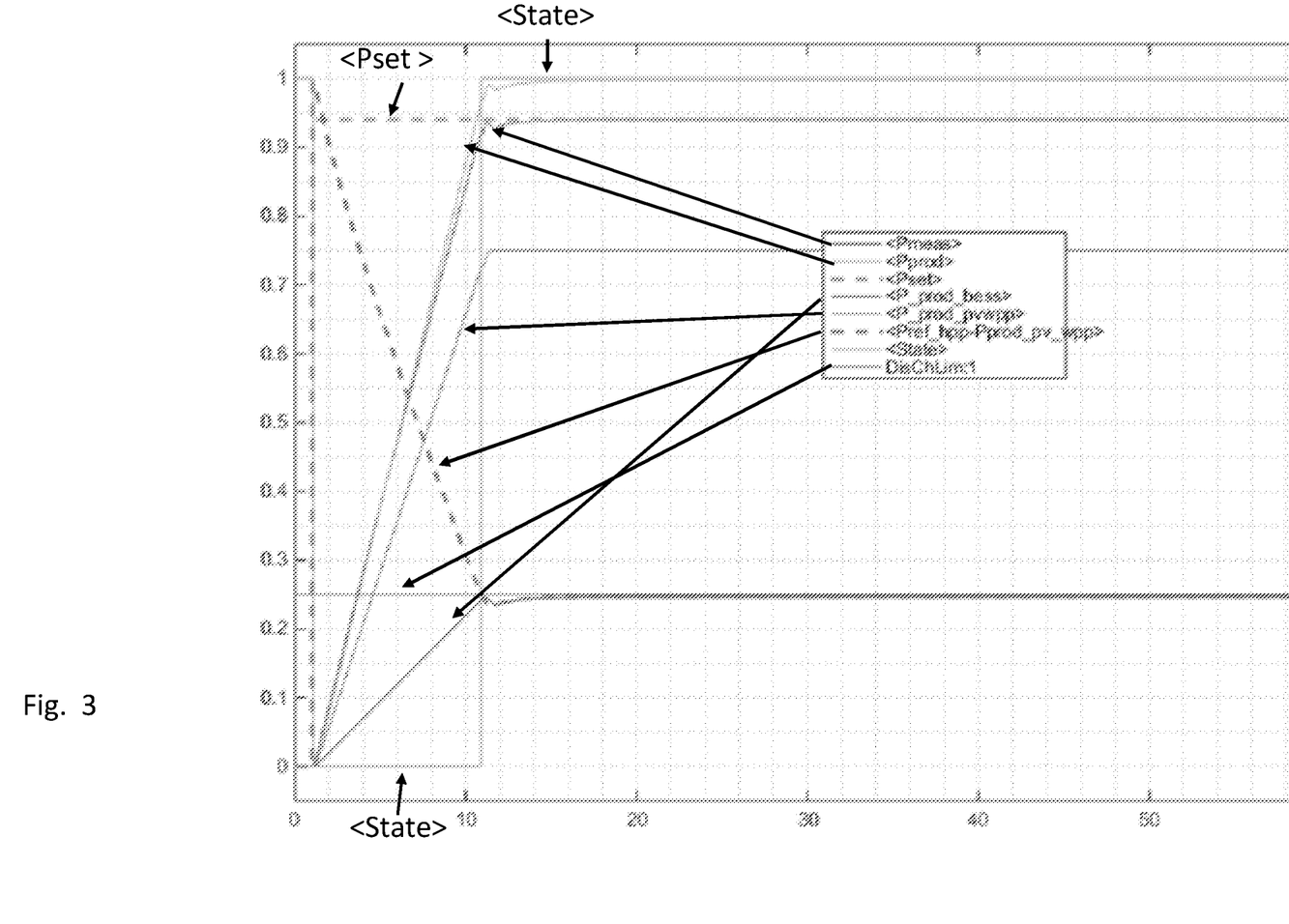
FIGS. 3 and 4 shows simulated graphs of two different situations of the hybrid power plant according to the present invention.
Figure 4:
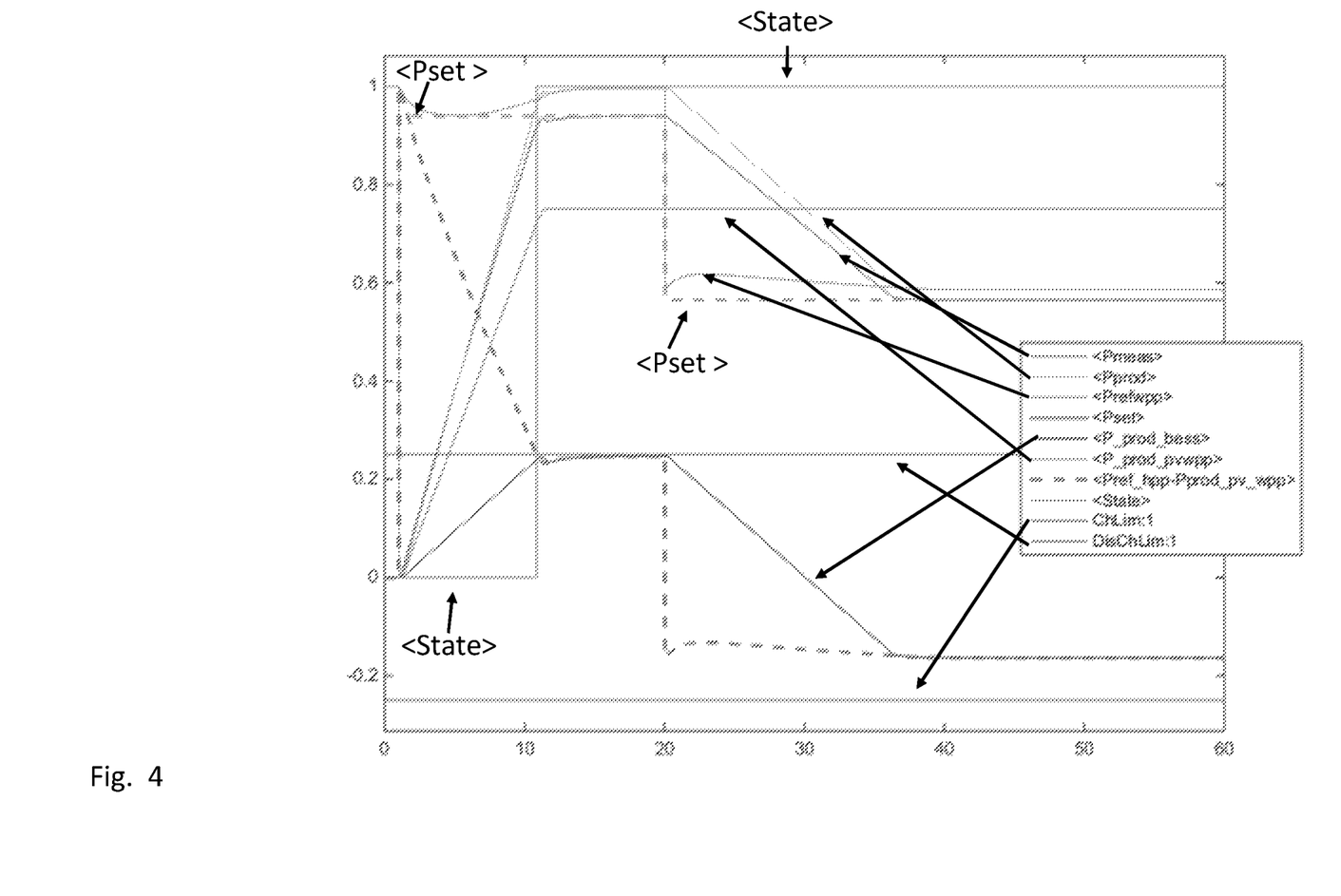

FIGS. 3 and 4 show simulated graphs of two different situations of the hybrid power plant according to the present invention, the vertical axis measures pu and the horizontal axis is measuring time (in seconds). These situations, or Use cases, show preliminary simulation results from a preliminary model for the hybrid power plant and its power plant controller PPC 200.

The following signals are shown in the graphs of FIGS. 3 and 4:

<Pmeas> Is the measured power at the PoM

<Pprod> Is the sum of power production from WTGs, PVs and BESs

<Pset> Is the active power reference of the loop i.e. P_ref_hpp

<P_prod_bess> is the active power production from the battery

<P_prod_pvwpp> is the actual power production from the PVs and WTGs

<Pref_hpp-Pprod_pv_wpp> is the reference received by the Set-Point SPLITTER from this invention, minus the <P_prod_pvwpp> described above <State> is a signal that shows when the reference to the battery is calculated as (<Pset> minus <P_prod_pvwpp>) and WTG and PV receive nominal references [in which case the state equals to 1] or energy storage unit, or battery, and PV and WTG references are calculated according to the modified weighting formulas [in which case the state equals to 0].

<DisChLim> is the discharging power limit of the battery

<ChLim> is the charging limit of the battery

FIG. 3 shows a simulation in which the power reference P_REF (called Pset) is stepped from 0 to approx. 0.95 pu. The following can be observed:

Plant reference minus WT&PV production is larger than DischargingLimit i.e. the battery discharging reference is calculated based on the battery weighting (just for the WT and PV actuators) (state "0")

As soon as the plant reference minus WT&PV production is less than Discharging limit the battery discharging reference is calculated as plant reference minus WT&PV production (state "1")

Note that both produced power Pprod and the measured power Pmeas show a quite smooth transition across the time around 11 seconds, where the power production from the battery P_prod_bess is constant, and how the ramp rates i.e. the slope of power curves are reasonably steady towards the desired power production P_REF (here Pset), which actually fall well within the present grid code tolerance bands.

FIG. 4 shows a simulation in which the power reference P_REF (called Pset) is stepped from 0 to approx. 0.95 pu and then back to approx. 0.6 pu. The following can be observed:

The same as in Use case 1 from FIG. 4, however notice here that when the set-point is stepped to 0.6 pu, the battery is now charging i.e. with negative pu value just above −0.2. Notice again that both produced power Pprod and the measured power Pmeas show a quite smooth transition at the time interval from around 20 seconds to 35 seconds, where the battery P_prod_bess changes from discharging to charging, and how the ramp rates i.e. the slope of the corresponding power curves are reasonably stable during this transition of the battery and until the power produced from the hybrid power plant reaches a new constant around 0.6 pu.

Figure 5:
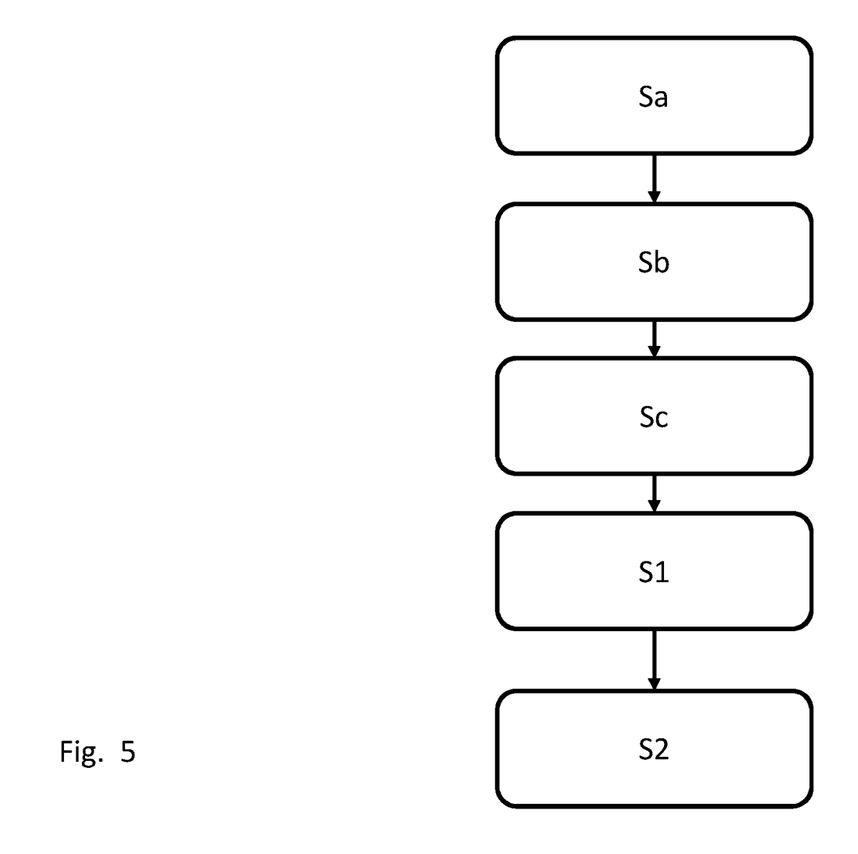
FIG. 5 is a schematic system-chart representing an outline of/in detail the operations of the computer program product according to the invention or a method according to the invention.

FIG. 5 is a schematic system-chart representing an outline of the operations of the computer program product according to the invention or a method according to the present invention. The method relates to controlling a hybrid power plant, the hybrid power plant 100 being connected to an associated electrical grid 1000 for producing power to said electrical grid, the hybrid power plant comprising a plurality of energy assets, cf. FIGS. 1 and 2, the plurality of energy assets EA1, EA2, and EA3, comprising:

Sa a first renewable power generating unit, i.e. first energy asset EA1 and 1RPGU, preferably said first renewable power generating unit comprises a plurality of wind turbine generators e.g. WTG1, WTG2 in FIGS. 1 and 2, Sb a second renewable power generating unit, i.e. second energy asset EA2 and 2RPGU, preferably said second renewable power generating unit comprises a plurality of solar power units e.g. PV1 and PV2 in FIGS. 1 and 2, and Sc an energy storage unit, i.e. third energy asset EA3 and ESU, preferably a battery energy storage system (BES) cf. FIGS. 1 and 2, said energy storage unit being capable of storing energy from said first and second renewable power generating units, and delivering power to said electrical grid when required, wherein the method comprises:

S1 controlling a power plant controller PPC, 200 arranged to communicate with the plurality of energy assets, the power plant controller being arranged for receiving an active power reference P_REF and correspondingly distribute active power set points, P_S1, P_S2, and P_S3 to the plurality of energy assets, and S2 receiving information indicative of a power limitation P_L3 from the energy storage unit ESU, and dynamically modify the active power set points by corresponding weighting factors, WF1, WF2, and WF3, according to the capabilities of the respective energy assets in response to said power limitation so as to produce active power from the hybrid power plant accordingly.

In summary, the present invention relates to a hybrid power plant 100 with a plurality of energy assets comprising several renewable power generating units, preferably in turn comprising wind turbines and/or solar power units, and an energy storage unit, such as battery energy system BES. A power plant controller 200, PPC receives information indicative of a power limitation P_L3 from the energy storage unit ESU cf. FIGS. 1 and 2, and dynamically modify the active power set points by corresponding weighting factors WF1, WF2, WF3, cf. formulas above, according to the capabilities of the respective energy assets in response to this power limitation so as to produce active power from the hybrid power plant. The invention may compensate for this power limitation by modifying correspondingly the active power set points of the hybrid power plant according to the capability of the energy assets so as to maintain a desired power production, and/or maintain a sufficiently smooth ramp rate when changing a parameter related to the power production, cf. FIGS. 3 and 4.

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A hybrid power plant connected to an associated electrical grid for producing power to said electrical grid, the hybrid power plant comprising a plurality of energy assets, the plurality of energy assets comprising:

a first renewable power generating unit, said first renewable power generating unit comprising a plurality of wind turbine generators, a second renewable power generating unit, said second renewable power generating unit comprising a plurality of solar power units, and an energy storage unit, a battery energy storage system, said energy storage unit being capable of storing energy from said first and second renewable power generating units, and delivering power to said electrical grid when required, wherein the hybrid power plant further comprises a power plant controller arranged to communicate with the plurality of energy assets, the power plant controller being arranged for receiving an active power reference and correspondingly distribute active power set points to the plurality of energy assets, and wherein the power plant controller is further arranged to receive information indicative of a power limitation from the energy storage unit, and dynamically modify the active power set points by corresponding weighting factors according to the capabilities of the respective energy assets in response to said power limitation so as to produce active power from the hybrid power plant accordingly.

2. The hybrid power plant according to claim 1, wherein the hybrid power plant further comprises:

a module for deriving an estimated value for electrical losses in the hybrid power plant;

a module for deriving a measured value for electrical losses in the hybrid power plant, based on a difference between an aggregated power production from the plurality of energy assets and a power measurement at a point of common coupling; and a regulator arranged to apply the estimated value for electrical losses and the measured value for electrical losses in an active power control loop in the power plant controller, the active power control loop being arranged to control an active power production of the hybrid power plant at the point of common coupling.

3. The hybrid power plant according to claim 1, wherein the information indicative of the power limitation comprises a charge discharge limitation from the energy storage unit being a third energy asset.

4. The hybrid power plant according to claim 3, wherein the first and second renewable power generating units form a first and a second energy asset, respectively, and, if a power limitation from the third energy asset results in a difference between the active power reference and an aggregated power production from the plurality of energy assets, the power plant controller then being arranged to modify the active power set points of said first and a second energy assets by corresponding weighting changing factors being a function of said difference between the active power reference and an aggregated power production measured from said first and second energy assets.

5. The hybrid power plant according to claim 4, wherein each corresponding weighting changing factor of an energy asset is further a function of the power from each energy asset.

6. The hybrid power plant according to claim 3, wherein the active power set point distributed by the power plant controller to the energy storage unit is determined by the capability of the third energy asset resulting from said power limitation in the third energy asset.

7. The hybrid power plant according to claim 3, wherein the hybrid power plant is operated in a mode, wherein the power plant controller distributes the active power set point to the energy storage unit, said active power set point being determined externally to the hybrid power plant.

8. The hybrid power plant according to claim 7, wherein the hybrid power plant is operated in a plurality of modes for the power plant controller, and wherein at least one mode among the plurality of modes is prioritised over the remaining modes.

9. The hybrid power plant according to claim 8, wherein a curtailment reduction mode, a constant power control mode, or a frequency control mode has priority over a mode wherein the active power set point is determined externally to the hybrid power plant.

10. The hybrid power plant according to claim 1, wherein the hybrid power plant is in a frequency control mode, wherein the power plant controller is operated so as to balance a frequency change by a corresponding power produced from the hybrid power plant particularly comprising discharging, or charging, the energy storage unit.

11. The hybrid power plant according to claim 1, wherein the hybrid power plant is in a constant power control mode, wherein the power plant controller is operated so as to maintain a substantially constant power level from the hybrid power plant according to the active power reference particularly comprising discharging accordingly the energy storage unit.

12. The hybrid power plant according to claim 1, wherein the hybrid power plant is operated in a curtailment reduction mode, wherein the power plant controller is operated so as to reduce, or limit,
curtailment of the first renewable power generating unit and
curtailment of the second renewable power generating unit by charging accordingly the energy storage unit.

13. A method for controlling a hybrid power plant, the hybrid power plant being connected to an associated electrical grid for producing power to said electrical grid, the hybrid power plant comprising a plurality of energy assets, the plurality of energy assets comprising:
a first renewable power generating unit, said first renewable power generating unit comprising a plurality of wind turbine generators,
a second renewable power generating unit, said second renewable power generating unit comprising a plurality of solar power units, and
a battery energy storage system being capable of storing energy from said first and second renewable power generating units, and delivering power to said electrical grid when required,
the method, comprising:
controlling a power plant controller arranged to communicate with the plurality of energy assets, the power plant controller being arranged for receiving an active power reference and correspondingly distribute active power set points to the plurality of energy assets, and
receiving information indicative of a power limitation from the battery energy storage system, and dynamically modify the active power set points by corresponding weighting factors according to the capabilities of the respective energy assets in response to said power limitation so as to produce active power from the hybrid power plant accordingly.

14. A power controller for controlling an associated hybrid power plant connected to an associated electrical grid for producing power to said electrical grid, the hybrid power plant comprising a plurality of energy assets, the plurality of energy assets comprising:
a first renewable power generating unit, said first renewable power generating unit comprising a plurality of wind turbine generators,
a second renewable power generating unit, said second renewable power generating unit comprising a plurality of solar power units, and
an energy storage unit, a battery energy storage system, said energy storage unit being capable of storing energy from said first and second renewable power generating units, and delivering power to said electrical grid when required,
wherein the power controller is arranged to communicate with the plurality of energy assets, the power controller being arranged for receiving an active power reference and correspondingly distribute active power set points to the plurality of energy assets, and
wherein the power controller is further arranged to receive information indicative of a power limitation from the energy storage unit, and dynamically modify the active power set points by corresponding weighting factors according to the capabilities of the respective energy assets in response to said power limitation so as to produce active power from the hybrid power plant accordingly.

15. A computer program product having instructions which, when executed by at least one processor of a power plant controller of a hybrid power plant, perform an operation, comprising:
receiving an active power reference and correspondingly distributing active power set points to a plurality of energy assets, the plurality of energy assets comprising: a first renewable power generating unit, said first renewable power generating unit comprising a plurality of wind turbine generators; a second renewable power generating unit, said second renewable power generating unit comprising a plurality of solar power units; and a battery energy storage system being capable of storing energy from said first and second renewable power generating units, and delivering power to an electrical grid;
receiving information indicative of a power limitation from the battery energy storage system; and
dynamically modify the active power set points by corresponding weighting factors according to the capabilities of the respective energy assets in response to said power limitation so as to produce active power from the hybrid power plant accordingly.

* * * * *